Patented Oct. 4, 1938

2,132,330

UNITED STATES PATENT OFFICE 2,132,330

PREPARATION OF NITROHYDROXY COMPOUNDS

Byron M. Vanderbilt, Terre Haute, Ind., assignor to Purdue Research Foundation, La Fayette, Ind., a corporation of Indiana No Drawing. Application June 30, 1937,
Serial No. 151,155

10 Claims. (Cl. 260—632)

My invention relates to the production of nitrohydroxy compounds by the reaction of nitrohydrocarbons and aldehydes. More specifically, my invention relates to the use of improved catalysts for the reaction of nitrohydrocarbons and aldehydes to produce nitrohydroxy compounds.

It has previously been known that nitroparaffins and aliphatic aldehydes could be reacted in the presence of an alkali metal catalyst to produce nitroalcohols or nitroglycols. According to this process one molecule of aldehyde may be added to the nitroparaffin at each hydrogen atom attached to the carbon atom to which the nitro group is attached. Thus it is possible to produce a trihydroxy compound from nitromethane, a dihydroxy compound from other primary nitroparaffins, and only a monohydroxy compound from a secondary nitroparaffin, in the past these reactions have been carried out in the presence of soluble alkali metal catalysts, but these catalysts have had certain disadvantages such as their tendency to induce aldehyde condensation reactions and polymerization and the difficulty of their removal from the final reaction mixture.

I have now discovered that certain classes of the tertiary amines which do not readily react with aldehydes and which have dissociation constants in excess of $K_b = 10^{-10}$ are suitable catalysts for this type of reaction and possess a number of advantages over catalysts previously employed. The use of such materials as catalysts substantially reduces the tendency of the aldehyde to condense or polymerize, and thus increases the yield of nitrohydroxy compounds over that obtainable when alkali metal or other previously suggested catalysts are used. A further advantage of the use of the tertiary amines as catalysts is the ease of their removal from the final reaction mixture when the more volatile ones are employed since they may be readily removed by aeration, by distillation at relatively low temperatures, or other suitable methods.

When employing the catalysts of my present invention I prefer, in general, to follow the procedure outlined in my co-pending application, Serial No. 146,855, filed June 7, 1937. According to this process the nitroparaffin is maintained in a concentration in excess of the theoretical throughout the reaction, a relatively low reaction temperature is employed, and the reaction mixture is maintained in a single phase system to minimize the formation of aldehyde condensation products. An auxiliary solvent, such as methyl or ethyl alcohol, is utilized in this procedure to maintain the reaction mixture in a single phase, and is preferably used only in the minimum concentration necessary to effect this end. The reaction temperature is maintained at a point sufficiently low to prevent substantial condensation of the aldehyde employed, and the safe limits of temperature have been found to be from approximately 25 to 60° C. depending on the particular catalyst, nitro compound and aldehyde employed.

When employing the catalysts of the present invention, the single phase procedure described above may be effected by dissolving the catalyst in a small amount of the nitroparaffin to be reacted. An auxiliary solvent such as methyl or ethyl alcohol may also be employed if desired. The nitroparaffin and aldehyde can then be introduced into the resulting mixture, with agitation, in proportions such that the nitroparaffin is slightly in excess of the theoretical concentration throughout the major portion of the reaction.

In carrying out the reactions according to the procedures discussed above the proportions of reactants will, of course, depend upon the type of nitrohydrocarbon employed and the desired product. If it is desired to produce a nitroalcohol, theoretically 1 mole of aldehyde should be employed per mole of nitroparaffin, and this will be found to be satisfactory in the case of secondary nitroparaffins since a nitroalcohol is then the only possible product. However, when employing the primary nitroparaffins, nitroalcohols and nitroglycols tend to be produced in an equilibrium mixture, and in this case it is desirable to utilize an excess of nitroparaffin if the nitroalcohol is the desired product. Conversely, if a nitroglycol is desired, two moles of formaldehyde per mole of nitroparaffin should be employed and a slight excess of formaldehyde may suitably be used. It has not been found possible to condense more than one mole of an aldehyde, other than formaldehyde, with a nitroparaffin other than nitromethane.

I have found that certain of the catalysts of this class are more suitable for use with certain of the aldehydes than with others. Thus, pyridine, having a low dissociation constant, is satisfactorily used only when formaldehyde is condensed with a nitroparaffin. The trialkylamines, however, can be used, in general, with any of the aldehydes.

The concentration of the catalyst to be employed will depend to some extent upon the catalyst and upon the particular reaction, since the various types of nitroparaffins do not react with equal ease. Thus, a higher concentration of catalyst is required for the reaction of a secondary nitroparaffin than is necessary in the case of a primary nitroparaffin. The concentration of trimethylamine used in my invention for example, may vary from 0.1 to 1.0% while up to 5% of pyridine may be necessary to secure good results. In any given case simple preliminary experiments will readily determine the optimum amount to be employed.

In carrying out the reaction according to the procedure discussed above, a reaction vessel is utilized which is equipped with cooling means and agitating means. Thorough agitation is effected throughout the addition of the aldehyde, and the temperature is preferably maintained between 25 and 60° C. In the case of formaldehyde an aqueous solution may be utilized, or the material may be introduced in the gaseous form, or even in the solid state as paraformaldehyde, if introduced gradually and thoroughly dispersed. The higher aldehydes may simply be introduced in their liquid state. If the initial temperature is substantially below 25° C., vigorous reaction may not be attained during addition of the aldehyde, in which case it would be necessary to raise the temperature to 25 to 60° C., and maintain it within this range until the primary reaction is complete. In most cases the course of the primary reaction may be followed by the tendency of the temperature to rise due to the exothermic nature of the reaction. External cooling should then be utilized to maintain the optimum temperature of 25–60° C. during this period. In this initial stage of the reaction the conversion to the nitrohydroxy compound is not quite completed, and for optimum conversion it is necessary to allow the mixture to stand at reaction temperature for a number of hours and, preferably, from 1 to 3 days. However, in a semi-continuous process the degree of conversion obtained in the initial stage may be found to be sufficient, if means are utilized to remove unreacted aldehyde and/or nitroparaffin without encountering losses by condensation.

At the conclusion of the reaction the catalyst may be removed by a preliminary distillation, by aeration, or by other suitable method. After the removal of the catalyst the nitroalcohol in the reaction mixture may be further purified by distillation, crystallization, or the like.

The following specific examples illustrate the application of my invention to the production of various nitrohydroxy compounds:

Example I

Eight hundred and eighty-one parts by weight of 2-nitrobutane were mixed with 29.5 parts of a 24.4% aqueous solution of trimethylamine in a reaction vessel. Seven hundred and forty-one parts of 36.44% formalin were added slowly to this solution with constant agitation at a temperature of 30–40° C. One hundred and sixty parts of methanol were then added in order to bring the mixture into one phase. The solution was held at 35–40° C. for 66 hours without further agitation. The catalyst and volatile solvents were then removed by distillation at 150 mm. pressure and the resulting nitroalcohol was distilled directly from the residue in a water white condition at 10 mm. of mercury pressure. One thousand and sixty-four parts of 2-methyl-2-nitro-1-butanol were obtained representing a 93.6% yield on the basis of the amount of 2-nitrobutane employed.

Example II

Three hundred and fifty-two parts by weight of acetaldehyde were added to a well agitated solution of 712 parts of 1-nitropropane, 380 parts of methanol, 25 parts of water, and 37 parts of a 24.4% aqueous solution of trimethylamine at 30–35° C. After addition was complete the temperature was slowly raised to 45–50° C. and the solution was allowed to stand at this temperature for three days. The catalyst and volatile solvents were then removed by distillation at 200 mm. of mercury pressure. Seven hundred and ninety-seven parts of 3-nitro-2-pentanol were distilled over at 10 mm. pressure, representing a 75% yield.

Example III

Thirty-four parts by weight of 2-methyl-1-nitropropane and 7 parts of a 7.61% aqueous solution of trimethylamine solution were placed in a vessel equipped with external cooling means, and thoroughly agitated. Formalin solution (36.44% HCHO) was then slowly introduced with continued agitation and external cooling until 55 parts had been added. The temperature was maintained at 30 to 35° C. during the addition of the formalin. The resulting solution was maintained at 40° C. for an additional three days. The catalyst and volatile solvents were then distilled at 200 mm. of mercury, the residue finally being heated to 100° C. at 30 mm. of mercury. Fifty parts of 2-nitro-2-isopropyl-1,3-propanediol remained as a residue in the distilling vessel representing 93% of the theoretical yield.

Example IV

Twenty and five-tenths parts by weight of nitromethane and one part of pyridine were mixed in a vessel. Eighty-two and five-tenths parts of formalin (36.44% HCHO) were added rapidly with agitation at room temperature to the above mixture and the resulting solution allowed to stand for 2 days at room temperature without further agitation. The reaction mixture was then distilled at 200 mm. the distillation finally being brought to 100° C. at 30 mm. of mercury. The residue solidified as a pale yellow crystalline solid. The yield of the 2-methylol-2-nitro-1,3-propanediol was 48.5 parts which represents 97% of the theoretical. One recrystallization of the crystalline material from acetone was sufficient to give a colorless product.

Example V

The procedure of Example IV was followed utilizing the following reactants: 30 parts by weight of 1-nitropropane, 55 parts of formalin (36.44% HCHO) and 3.9 parts of pyridine. After addition of the aldehyde, 12.2 parts of methanol were added to bring the mixture into one phase. The mixture was allowed to stand for 2½ days at 50° C. without agitation before distillation. Forty-eight parts of 2-ethyl-2-nitro-1,3-propanediol were obtained representing 96% of the theoretical yield.

It is to be understood, of course, that my invention is not to be construed as limited to the particular examples given above. The catalysts of the present invention are applicable generally to the production of nitrohydroxy compounds from nitroparaffins and aldehydes, or substituted aldehydes. Likewise, the reaction may be effected in the presence of an auxiliary solvent in the manner previously described, and the procedure may be modified in numerous other respects without departing from the scope of my invention.

Amines other than those indicated in the above examples may also be used as catalysts for carrying out this general reaction. For example, I have found that triethylamine, tributylamine, triethanolamine, and other tertiary amines such as quinoline, quinaldine and other substituted tertiary amines may also be employed. In general, however, the higher trialkylamines and certain of the aromatic tertiary amines have relatively higher boiling points and are not so readily separated from the reaction mixture as are trimethylamine and pyridine. In certain instances, it will be found necessary to form the salt of the amine, as in the case of the alkali metal catalysts, from which the nitrohydroxy compound may be separated by distillation or other means, the salt being left in the residue. In general, it may be stated that any of the tertiary amines may be employed that will not react with the aldehyde used and that have a dissociation constant within the desired range, e. g., $K_b = 10^{-10}$.

My invention now having been described, what I claim is:

1. In a process for the production of nitrohydroxy compounds by the reaction of nitroparaffins and aldehydes, the improvement which comprises effecting the reaction in the presence of a catalyst essentially comprising a tertiary amine which does not readily react with the aldehyde employed and has a dissociation constant in excess of $K_b = 10^{-10}$.

2. In a process for the production of nitrohydroxy compounds by the reaction of nitroparaffins and aldehydes, the improvement which comprises effecting the reaction in the presence of a catalyst essentially comprising a tertiary amine which does not readily react with the aldehyde employed and has a dissociation constant in excess of $K_b = 10^{-10}$, and at the conclusion of the reaction removing the catalyst by distillation from the reaction mixture.

3. In a process for the production of nitrohydroxy compounds by the reaction of nitroparaffins and aldehydes, the improvement which comprises effecting the reaction in the presence of a catalyst essentially comprising a tertiary alkylamine.

4. In a process for the production of nitrohydroxy compounds by the reaction of nitroparaffins and aldehydes, the improvement which comprises effecting the reaction in the presence of a catalyst essentially comprising trimethylamine.

5. In a process for the production of nitrohydroxy compounds by the reaction of nitroparaffins and aldehydes, the improvement which comprises effecting the reaction in the presence of a catalyst essentially comprising triethylamine.

6. In a process for the production of nitrohydroxy compounds by the reaction of nitroparaffins and formaldehyde, the improvement which comprises effecting the reaction in the presence of a catalyst essentially comprising pyridine.

7. In a process for the production of nitrohydroxy compounds by the reaction of nitroparaffins and aldehydes, the improvement which comprises effecting the reaction in the presence of a catalyst essentially comprising a tertiary alkylamine, and at the conclusion of the reaction removing the catalyst by distillation from the reaction mixture.

8. In a process for the production of nitrohydroxy compounds by the reaction of nitroparaffins and aldehydes, the improvement which comprises effecting the reaction in the presence of a catalyst essentially comprising trimethylamine, and at the conclusion of the reaction removing the catalyst by distillation from the reaction mixture.

9. In a process for the production of nitrohydroxy compounds by the reaction of nitroparaffins and aldehydes, the improvement which comprises effecting the reaction in the presence of a catalyst essentially comprising triethylamine, and at the conclusion of the reaction removing the catalyst by distillation from the reaction mixture.

10. In a process for the production of nitrohydroxy compounds by the reaction of nitroparaffins and formaldehyde, the improvement which comprises effecting the reaction in the presence of a catalyst essentially comprising pyridine, and at the conclusion of the reaction removing the catalyst by distillation from the reaction mixture.

BYRON M. VANDERBILT.